(12) United States Patent
Wijn et al.

(10) Patent No.: US 6,175,052 B1
(45) Date of Patent: Jan. 16, 2001

(54) IN-SITU METHOD FOR CLEANING SOIL POLLUTED WITH HALOGENATED PRODUCTS

(75) Inventors: Gerardus Johannes Wijn, Druten; Johannes Fredericus De Kreuk, Milsbeek; Gosse Schraa, Bennekom; Hubertus Henricus Martinus Rijnaarts, Nijmegen, all of (NL)

(73) Assignee: Biosoil B.V., Hendrik Ido Ambacht (NL)

(*) Notice: Under 35 U.S.C. 154(b), the term of this patent shall be extended for 0 days.

(21) Appl. No.: 09/205,196

(22) Filed: Dec. 4, 1998

(30) Foreign Application Priority Data

Dec. 5, 1997 (NL) .................................................. 1007712

(51) Int. Cl.[7] .............................. C09K 17/14; B09B 3/00; A62D 3/00
(52) U.S. Cl. ............................. 588/206; 71/10; 405/264; 435/262.5
(58) Field of Search .................................. 405/118, 263, 405/264; 435/262, 262.5; 588/206; 71/10

(56) References Cited

U.S. PATENT DOCUMENTS

| 5,525,139 | 6/1996 | Gill . | |
|---|---|---|---|
| 5,605,417 | 2/1997 | Englert et al. . | |
| 5,656,486 | 8/1997 | Daniels . | |
| 5,660,612 | * 8/1997 | Bernier et al. | 71/15 |
| 5,840,571 | * 11/1998 | Beeman et al. | 435/262.5 |
| 6,001,252 | * 12/1999 | Rice et al. | 210/610 |

FOREIGN PATENT DOCUMENTS

| 0 436 493 | 7/1991 | (EP) . |
| 0 569 199 | 11/1993 | (EP) . |
| 0 614 709 | 9/1994 | (EP) . |
| WO 96/28400 | 9/1996 | (WO) . |

* cited by examiner

Primary Examiner—Tom Dunn
Assistant Examiner—Elin A. Warn
(74) Attorney, Agent, or Firm—Young & Thompson

(57) ABSTRACT

Described is a method for in-situ cleaning of a soil fraction contaminated with halogenated products, in particular with chlorinated products. This method comprises at least the step of introducing an electron donor under substantially anaerobic conditions into the relevant soil fraction. The electron donor herein comprises compost and/or derivatives thereof. In preference the electron donor originates substantially from the first filtrate fraction of compost. This first filtrate fraction comprises liquid released during the first 96 hours after composting.

8 Claims, 1 Drawing Sheet

IN-SITU METHOD FOR CLEANING SOIL POLLUTED WITH HALOGENATED PRODUCTS

FIELD OF THE INVENTION

The present invention relates to a method for in-situ cleaning of a soil fraction contaminated with halogenated products, particularly chlorinated products, at least comprising the step of introducing an electron donor under substantially anaerobic conditions in the relevant soil fraction.

BACKGROUND OF THE INVENTION

The cleaning of soil fractions contaminated with inter alia chlorinated products such as for instance tetrachloroethene and trichloroethene is no simple matter. In the past this cleaning was mainly carried out ex-situ, wherein water was pumped through the contaminated soil fraction to dissolve the chlorinated products, whereafter the water with the chlorine products dissolved therein was cleaned above ground. It will be apparent that such a method is not only time-consuming but also costly.

Another method, wherein the cleaning of the soil fraction takes place in-situ, comprises a two-step reaction in which anaerobic and aerobic operations are performed alternately. During the first step of this two-step reaction, possibly present tetra- and trichloroethene is converted anaerobically into cis-1,2-dichloroethene, while in the second step this latter is converted aerobically into carbonic acid, water and chloride. A drawback of this method is that it must be carried out in two steps, wherein different and incompatible conditions—i.e. anaerobic and aerobic—must be brought about for the growth of the micro-organisms involved in this process. There is moreover the danger that during the first step a significant quantity of carcinogenic vinyl chloride can be formed.

As an example of a publication in which the above stated two-step reaction is described can be mentioned the European patent with publication number EP-B-0 569 199. In this publication is described an in-situ method for the biological decomposition of halogenated organic compounds in aqueous soil fractions, wherein under the influence of anaerobic conditions an electron donor is supplied to the soil fraction in order to stimulate the dehalogenating bacteria acting under anaerobic conditions and wherein the biological formation of lower halogenated compounds is limited by maintaining a sulphate-reducing environment in the fraction with biological activity. When the greater part of the lower halogenated compounds has been removed, the anaerobic conditions are transformed into aerobic conditions by adding oxygen so that the bacteria acting under aerobic conditions are activated. The biological decomposition of halogenated organic compounds is continued using these aerobic bacteria so as to ultimately form non-hazardous organic compounds and water.

SUMMARY OF THE INVENTION

The present invention has for its object to provide a method for in-situ cleaning of a soil fraction contaminated with chlorinated products, wherein a substantially complete decomposition of chlorine compounds to substantially ethene and ethane takes place, and wherein the above stated drawbacks do not occur. To this end the present invention provides a method as according to the preamble which is characterized in that the electron donor comprises compost and/or derivatives thereof.

Tests have demonstrated that when an electron donor comprising compost is introduced in substantially anaerobic conditions into a soil fraction contaminated with chlorinated products, a complete decomposition of the chlorine compounds present in the soil fraction to substantially ethene and ethane is brought about. The method can be performed in one step under anaerobic conditions and therefore avoids the drawbacks associated with the above described two-step reaction. Derivatives of compost are understood to mean extracts or filtrates of compost.

In preference the electron donor originates substantially from the first so-called filtrate fraction of compost.

When material is composted, liquid, or a filtrate fraction, is herein released quite quickly. This filtrate fraction comes from the acidification of the compost material. The present invention is based on the insight that precisely this first filtrate fraction, which contains a relatively large number of low fatty acids, is very suitable as electron donor and results in an optimal dehalogenation of the chlorinated products present in the ground. The use of this first filtrate fraction as electron donor is moreover found to produce very favourable results every time.

It is of great importance that the method according to the present invention be performed under anaerobic conditions. The decomposition of tetrachloroethene will in any case not proceed under aerobic conditions. There is also the danger of the formation of peroxide in aerobic decomposition of lower chlorinated ethenes which can result in the death of the micro-organisms functioning for the dehalogenation. When a particular soil fraction is for instance contaminated with both chlorinated products and oil, it is therefore recommended to first remove the chlorinated products by means of the method according to the present invention and only then to aerate the ground in order to remove the oil.

So that the filtrate fraction can function as optimally as possible as electron donor, the first filtrate fraction preferably comprises the liquid released during the first 96 hours after composting.

The compost particularly comprises substantially vegetable material.

A filtrate fraction coming from vegetable material as compost base is found to produce very good results in the above stated method.

In order to maintain the above stated favourable results the compost comprises at least 60% organic material.

In practice the method according to the present invention works as follows. An electron donor originating substantially from the first filtrate fraction of compost is introduced into a soil fraction contaminated with chlorinated products. This can take place for instance by pumping the electron donor into the soil fraction at different locations. The groundwater present in the soil fraction and serving as transport medium is then caused to circulate using a pump system. Transport of the electron donor through the contaminated soil fraction hereby takes place. The dehalogenation of the chlorinated products takes place when the micro-organisms, the chlorinated products and the electron donor present in the ground come into mutual contact.

The present invention will be elucidated in the following with reference to two examples.

BRIEF DESCRIPTION OF THE DRAWINGS

The sole FIGURE is a graphical representation of groundwater analyses according to the invention.

DETAILED DESCRIPTION OF THE INVENTION

EXAMPLE I

Figure 1:
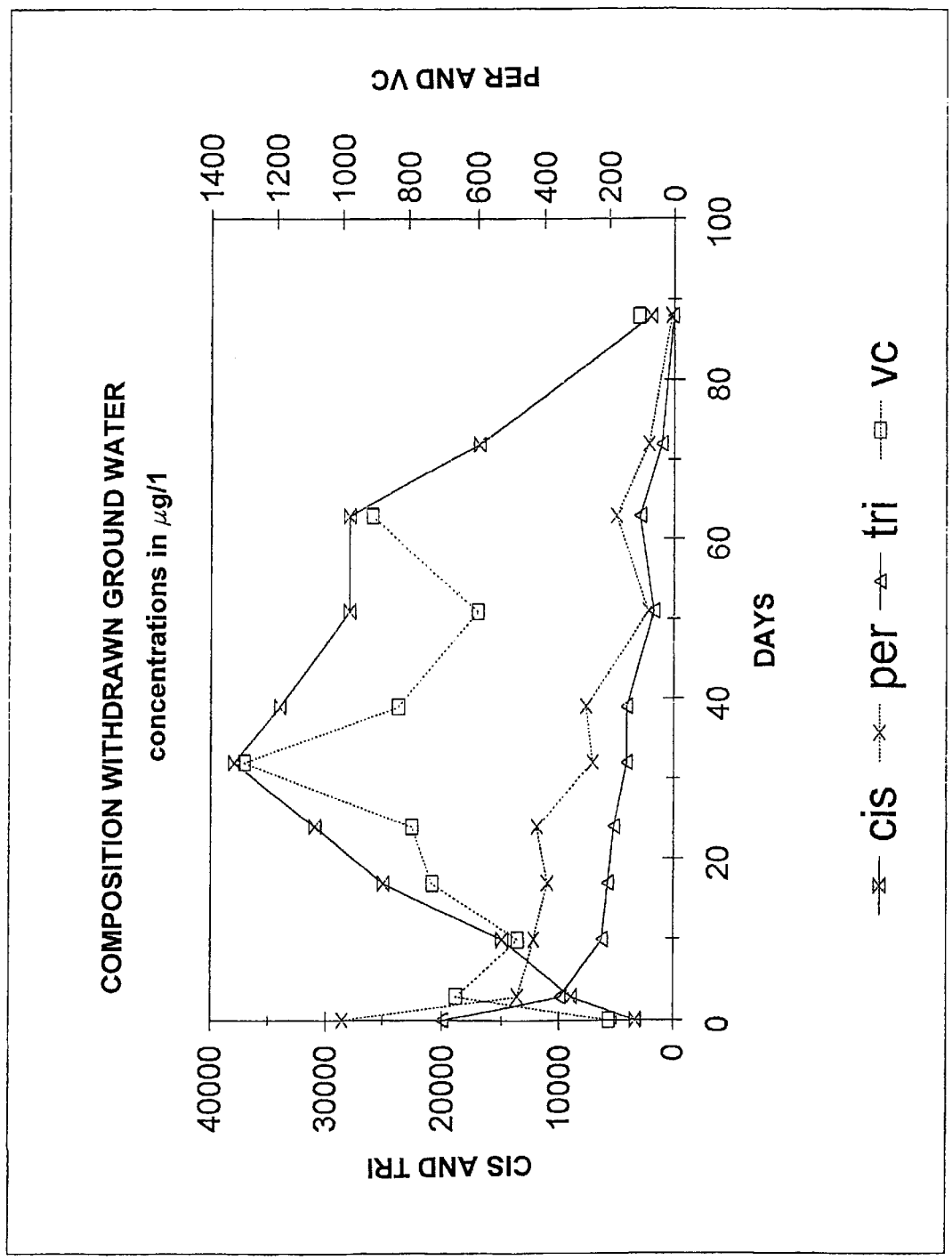

Column experiments were performed using both natural and artificial groundwater. Natural groundwater was enriched for this purpose with tetrachloroethene, trichloroethene and a compost extract, wherein a concentration of tetrachloroethene of 20000 µg l$^{-1}$ and a concentration of trichloroethene of 70000 µg l$^{-1}$ were reached. Different samples of artificial groundwater were likewise enriched with tetrachloroethene and determined electron donors, wherein tetrachloroethene was added in a concentration of 50 µM.

The compost extract was prepared by stirring 450 grams of fresh compost for three days with 1.5 l demineralized water. The extract was then centrifuged for 20 minutes at 6000 rotations per minute. The liquid rising to the surface was supplemented with groundwater to 2 l.

Glass columns with a height of 15 cm and a diameter of 2.3 cm were packed with soil from a contaminated soil fraction. The different samples of enriched natural groundwater and artificial groundwater were allowed to seep through respective soil packed in columns and samples flowing in and out of the column were analysed. The residence time in the column was 1 day. During the experiment the equipment used was continuously flushed with nitrogen gas to bring about anoxic conditions.

The results of the analysis are set out in table 1.

TABLE 1

| groundwater | electron donor | removal of tetrachloroethene % | final product |
|---|---|---|---|
| artificial | none | 50 | trichloroethene |
| artificial | acetate | >99 | trichloroethene |
| artificial | methanol | >99 | trichloroethene |
| artificial | propionate | >99 | trichloroethene/ cis-dichloroethene |
| artificial | lactate | >99 | cis-dichloroethene |
| natural | none | >99 | cis-dichloroethene |
| natural | compost | >99 | ethene |

As shown clearly in table 1, a complete dechlorination of tetrachloroethene to ethene is only achieved using natural groundwater enriched with a compost extract. In all other cases there only takes place a decomposition of tetrachloroethene to trichloroethene or cis-dichloroethene.

EXAMPLE II

A soil fraction contaminated with tetra- and trichloroethene was treated in accordance with the method according to the invention. Groundwater was extracted from the soil fraction and enriched with an electron donor originating from the first filtrate fraction of compost. This filtrate fraction comprises liquid released during the first 96 hours after composting of preferably vegetable material. The enriched groundwater was subsequently introduced into the soil fraction by means of an injection system. The groundwater was analysed for a period of ninety days in order to determine the degree of contaminating substances present.. The results of the groundwater analyses are shown in FIG. 1.

In the first instance a sharp increase in the content of cis-1,2-dichloroethene was detected as well as in the content of vinyl chloride, though to a lesser extent. After about 32 days a fall in the cis-1,2-dichloroethene content was detected without a corresponding rise in the vinyl chloride content occurring. The tetra- and trichloroethene content decreased sharply during the whole measurement period and fell from respectively about 900 µg/l and 20,000 µg/l to—virtually—0 µg/l.

A repetition of the experiment produced similar results.

What is claimed is:

1. Method for in-situ cleaning of a soil fraction contaminated with chlorinated products, which consists essentially of introducing an electron donor under substantially anaerobic conditions into the contaminated soil fraction, and wherein the electron donor comprises substantially a first filtrate fraction of compost and/or derivatives thereof.

2. The method according to claim 1, wherein the first filtrate fraction comprises liquid released during the first 96 hours after composting.

3. The method according to claim 1, wherein the compost comprises substantially vegetable material.

4. The method according to claim 2, wherein the compost comprises substantially vegetable material.

5. The method according to claim 1, wherein the compost comprises at least 60% organic material.

6. The method according to claim 2, wherein the compost comprises at least 60% organic material.

7. Method for in-situ biological decontamination of a soil fraction contaminated with chlorinated products, which consists essentially of introducing into the contaminated soil fraction, under substantially anaerobic conditions, a first filtrate fraction of compost as an electron donor so as to obtain a decontaminated soil fraction containing a dehalogenated product; said first filtrate fraction comprising liquid released during the first 96 hours after composting a compost comprising at least 60% organic material.

8. The method according to claim 7, wherein the chlorinated products are selected from the group consisting of tetrachloroethene and trichloroethene, and the dehalogenated product is ethene.

* * * * *